Nov. 4, 1969

R. F. CONDRAC 3,476,414

PIPE JOINT

Filed Nov. 30, 1966

INVENTOR.
ROBERT F. CONDRAC
By Donald G. Dalton
Attorney

United States Patent Office 3,476,414
Patented Nov. 4, 1969

3,476,414
PIPE JOINT
Robert F. Condrac, Penn Hills Township, Allegheny County, Pa., assignor to United States Steel Corporation, a corporation of Delaware
Filed Nov. 30, 1966, Ser. No. 598,056
Int. Cl. F16l *19/00, 21/02*
U.S. Cl. 285—349                          5 Claims

ABSTRACT OF THE DISCLOSURE

A joint which provides a high-pressure seal for a pipe connected to a pressure source. Avoids tapered threads or welds. Seal obtained by O-ring surrounding a neck on the pipe and held in place by straight threaded nuts and fittings.

Figure 1:
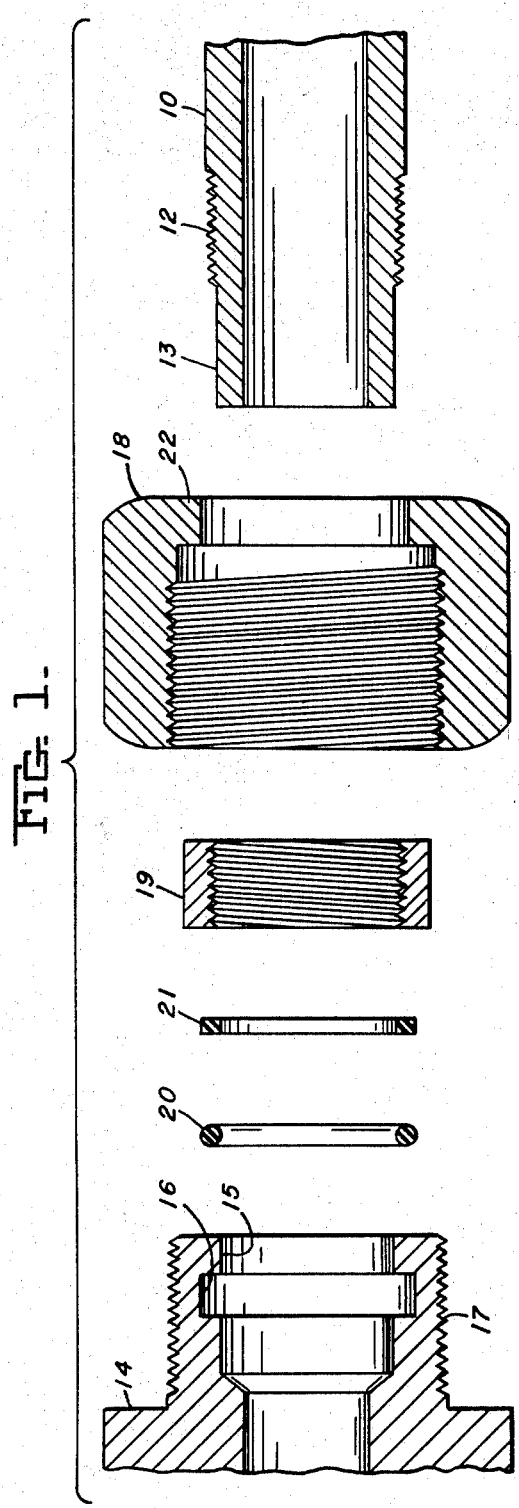

This invention relates to an improved sealing joint for connecting a pipe to a source of high pressure.

Conventional practice in connecting a pipe to a high-pressure source is to use tapered threads or a welded joint to afford a seal against leakage. Parts which have tapered threads not only are difficult to assemble, but they do not readily maintain a sealed connection at pressures higher than about 300 p.s.i. Helical leakage occurs if the joint is not sealed with tape or the like. Welded joints likewise are troublesome to form.

An object of the present invention is to provide an improved joint which affords a positive seal without tapered threads or welding.

A further object is to provide a joint which affords such a seal yet utilizes only simple elements including an O-ring and straight threaded connections.

Figure 2:
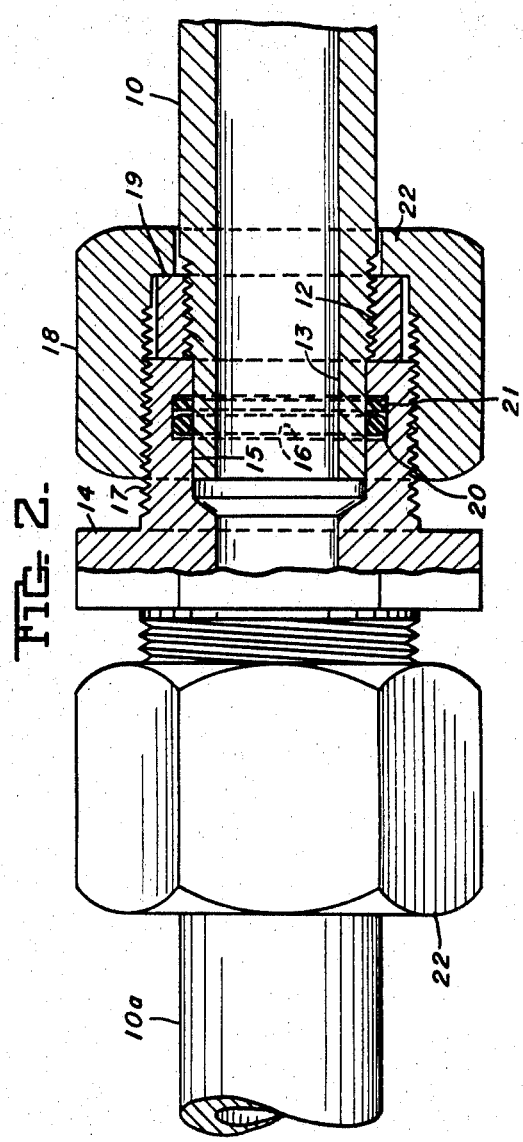

In the drawing:

FIGURE 1 is an exploded longitudinal sectional view of the parts of the sealing joint; and FIGURE 2 is a side elevational view, partly in section, of the assembled joint.

FIGURE 1 shows the end portion of a pipe 10 which is to be connected to a high-pressure source. The pipe has straight external screw threads 12, preferably left-hand, spaced from its end, and a neck 13 of reduced diameter extending from the threads to the end. The pipe of course is of a strength to resist whatever pressure is to be encountered. The joint of my invention includes a fitting 14, which either is connected to a source of pressure or forms a part thereof. For example, in FIGURE 2 the fitting is a union which is connected to another pipe 10a through a second similar joint constructed according to my invention. The fitting 14 has a socket 15, an internal groove 16 surrounding the socket, and straight external screw threads 17, preferably right hand. I insert the end portion of pipe 10 through an internally threaded nut 18, and engage an internally threaded sleeve 19 with the threads 12. I insert a resilient O-ring 20 and back-up ring 21 within groove 16. I insert the neck 13 in socket 15 and adjust the sleeve 19 to a position in which it abuts the end face of fitting 14. Finally I engage nut 18 with threads 17 on the fitting and tighten this nut. The nut has an internal flange 22 which abuts sleeve 19.

When I assemble the parts as I describe, the O-ring 20 and back-up ring 21 fit closely around neck 13. Flange 22 on nut 18 bears against sleeve 19 and forces neck 13 into socket 15. Since threads 12 and 17 are of opposite hand, there is no tendency for nut 18 to turn sleeve 19 in a direction to withdrawn the neck from the socket. Thus engagement of the rings 20 and 21 with the neck and engagement of sleeve 19 with the end of the fitting furnishes a pressure-tight seal.

While I have shown and described only a single embodiment of my invention, it is apparent that modifications may arise. Therefore, I do not wish to be limited to the disclosure set forth.

I claim:

1. A sealing joint for connecting a pipe to a source of pressure, said joint comprising:
   a pipe having straight external screw threads spaced from its end and a neck of reduced diameter extending from said threads to the end of the pipe;
   a fitting having a socket, an internal groove surrounding said socket, and straight external screw threads;
   a resilient sealing ring within said groove;
   said neck being received in said socket and ring;
   a straight-sided sleeve of shorter length than the externally threaded portion of said pipe and having internal screw threads engaging said first-named external threads;
   one end of said sleeve abutting the end face of said fitting; and
   a nut having internal screw threads engaging said second-named external threads and an internal flange abutting the other end of said sleeve;
   said sleeve being housed entirely within said nut.

2. A joint as defined in claim 1 in which said second-named external threads are of opposite hand from said first-named extend threads.

3. A joint as defined in claim 1 in which said first-named external threads are left hand and said second-named external threads are right hand.

4. A joint as defined in claim 1 in which said groove also contains a resilent back-up ring.

5. A joint as defined in claim 1 in which said fitting is a union connected to another pipe through a second similar joint.

References Cited

UNITED STATES PATENTS

| 1,799,762 | 4/1931 | Rathbun | 285—356 X |
| 2,366,010 | 12/1944 | Dies | 285—414 X |
| 2,497,987 | 2/1950 | Goode | 285—349 |
| 2,599,389 | 6/1952 | Hume | 285—351 X |
| 3,326,583 | 6/1967 | Guarnaschelli | 285—356 X |
| 3,266,824 | 8/1966 | Nealy | 285—356 X |

FOREIGN PATENTS 681,220   1/1930   France.

DAVID J. WILLIAMOWSKY, Primary Examiner

D. W. AROLA, Assistant Examiner

U.S. Cl. X.R.

285—354, 369